No. 862,349. PATENTED AUG. 6, 1907.
A. R. ROBBINS.
HOSE COUPLING.
APPLICATION FILED AUG. 8, 1904.
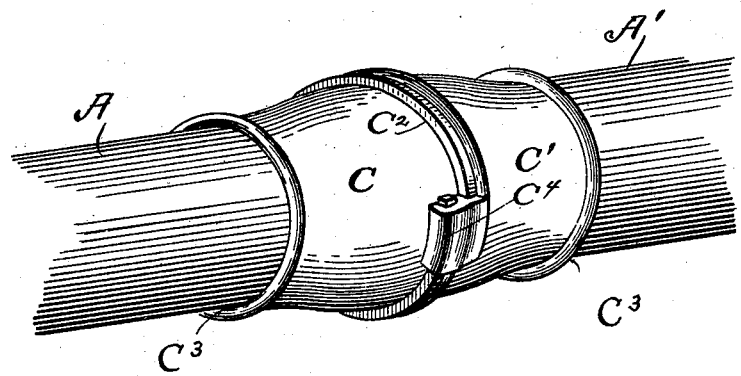
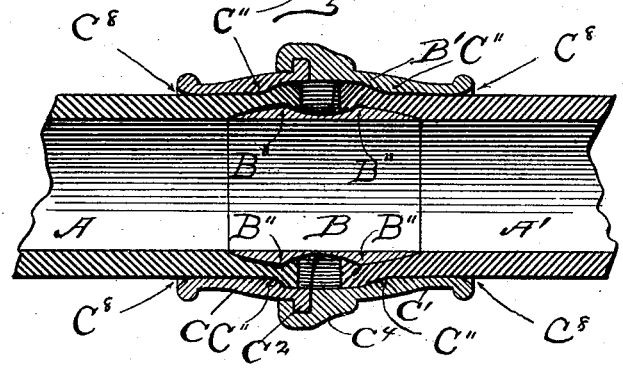
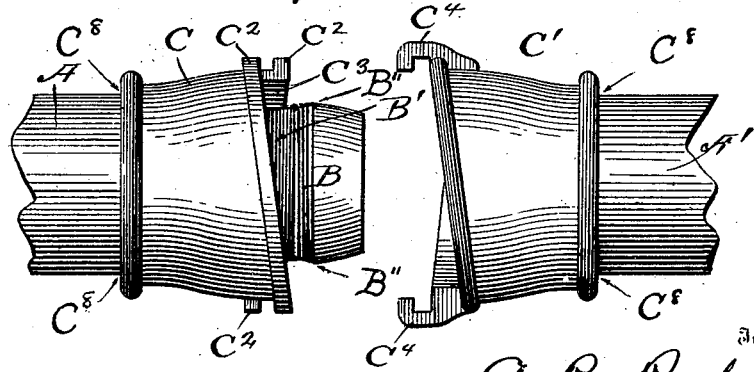

UNITED STATES PATENT OFFICE.

ALFRED R. ROBBINS, OF OCEANPARK, CALIFORNIA.

HOSE-COUPLING.

No. 862,349.  Specification of Letters Patent.  Patented Aug. 6, 1907.

Application filed August 8, 1904. Serial No. 219,931.

*To all whom it may concern:*

Be it known that I, ALFRED R. ROBBINS, a citizen of the United States, residing at Oceanpark, in the county of Los Angeles and State of California, have invented a new and useful Improvement in Hose-Couplings, of which the following is a specification.

The object of this invention is a coupler adapted for uniting sections of hose, the union being quickly, easily, and securely made, and the sections as easily and quickly detached when desirable.

A further object of the invention is to provide a coupler of this kind which will not diminish the diameter of the hose or pipe line as a whole, and which will not offer any obstruction to the flow of a liquid through the coupling by reason of a constricted passageway or inwardly projecting shoulders.

With these objects in view the invention consists in the novel features of construction and combination of parts hereinafter described, particularly pointed out in the claims, and shown in the accompanying drawings, in which:

Figure 1 is a detail perspective view of my coupling. Fig. 2 is a longitudinal section through the coupling and adjacent hose sections. Fig. 3 is a detail side elevation showing the parts uncoupled.

In these drawings A, and A', represents sections of hose to be united by my coupling. A cylindrical metal sleeve B, preferably of brass is provided having an interior diameter equal to the interior diameter of the hose sections A and A'.

The sleeve B, is exteriorly tapered or reduced in thickness toward each end, as most clearly shown in Fig. 2, and is exteriorly circumferentially grooved as shown at B'. The expanded portions of the sleeve adjacent to the circumferential groove forming a circumferential shoulder $B^2$, for the purpose hereinafter set forth. This groove (in coupling) forms a space for the natural expansion of the protruding ends of the hose sections A and A', within the coupling and also enables the sleeve to be securely grasped by the fingers when the sleeve is to be removed from the end of a hose section. I also provide two metal coupling sections, also preferably of brass and shown at C, and C'. Near their rear ends these sections have an interior diameter substantially equal to the exterior diameter of the hose, this diameter is maintained towards the meeting ends for a distance approximating two-thirds of the entire length of each section of C, and C', the interior diameters of the coupling sections C, and C', then gradually increasing interiorly toward their meeting ends thereby forming an offset or shoulder $C^2$, interiorly to act (in coupling together) as an inside circumferential shoulder opposite to the circumferential shoulders provided exteriorly on the sleeve B, aforementioned. The rear ends of coupling sections C, and C', are also beveled exteriorly at $C^8$, circumferentially to permit of the easy insertion of the hose ends A, and A', within the sections C, and C'. The coupling section C, carries at its meeting end, which is cut spirally, semi-circular, spirally arranged shoulders $C^2$, the ends of the shoulders being offset with reference to each other, due to the offset portions $C^3$. The section C', of the coupling is also spirally cut at the meeting end to fit the meeting end of the section C, and carries oppositely arranged, projecting flanges $C^4$, adapted to engage the shoulders or threads $C^2$, carried by the section C, and thereby lock the two sections together by giving a half turn to either section.

In assembling the parts of the section A, of the hose is inserted or fitted in section C, of the coupler, and the section A', of the hose in section C', of the coupler, though this arrangement could of course be reversed. The sleeve B, is then pressed into one of the coupling sections, and I have illustrated it as being secured in the coupling section C. The section C', of the coupler is then secured to the section C, in the usual manner of joining two threaded sections, and it will be noted that the sleeve B, is entirely inclosed by the coupler sections C, and C', and that near to the adjacent ends of the hose sections A, and A', are gripped and slightly compressed between the circumferential shoulders or offsets on the sleeve B, and their opposites or corresponding interior shoulders on said coupler sections C, and C', the hose ends protruding within the space allowed by the expansion of sections C, and C', and the groove on B, and B', and it will be furthermore noted that instead of the hose sections being compressed inwardly, thus having their mean diameter decreased, that the ends of the sleeve B, fit into the said hose sections and expand them adjacent their ends. By this means a very secure coupling is provided without furnishing any obstacle to the flow of liquid.

Having thus fully described my invention, what I claim as new and desire to secure by Letters Patent is:—

1. A coupler of the kind described comprising a section having a spiral shoulder at its end, a section having diametrically opposite projecting flange portions adapted to engage the shoulder of the first mentioned section, and a sleeve adapted to lie within the said sections, the sleeve tapering exteriorly toward its ends and circumferentially grooved midway its ends, as and for the purpose set forth.

2. A coupler of the kind described comprising a section having a spiral shoulder at its end, a section having diametrically opposite projecting flange portions adapted to engage the shoulder of the first mentioned section, and a sleeve adapted to lie within the said sections, the sleeve tapering exteriorly toward its end, and circumferentially grooved midway its ends, as and for the purpose set forth.

ALFRED R. ROBBINS.

Witnesses:
T. H. DUDLEY,
A. J. WILKINS.